United States Patent [19]

Ueno et al.

[11] Patent Number: 5,162,912
[45] Date of Patent: Nov. 10, 1992

[54] PHOTOELECTRIC CONVERSION APPARATUS ELIMINATING NOISE IN AN OUTPUT SIGNAL

[75] Inventors: Isamu Ueno, Atsugi; Seiji Hashimoto, Yokohama; Masami Takeda, Atsugi, all of Japan

[73] Assignee: Canon Kabushiki Kaisha, Tokyo, Japan

[21] Appl. No.: 508,893

[22] Filed: Apr. 5, 1990

[30] Foreign Application Priority Data

Apr. 10, 1989 [JP] Japan ................................. 1-87891
Apr. 10, 1989 [JP] Japan ................................. 1-87893
Jun. 6, 1989 [JP] Japan ................................. 1-142140

[51] Int. Cl.⁵ ............................................. H04N 5/335
[52] U.S. Cl. ........................... 358/213.16; 358/213.11; 358/213.15; 358/213.29
[58] Field of Search ............ 358/209, 213.15, 213.16, 358/213.17, 213.18, 213.19, 213.26, 213.29, 213.11; 250/208.1, 208.2, 208.3, 208.4, 208.5

[56] References Cited

U.S. PATENT DOCUMENTS

| | | | |
|---|---|---|---|
| 4,752,741 | 6/1988 | Kim et al. | 328/165 |
| 4,809,074 | 2/1989 | Imaide et al. | 350/213.15 |
| 4,835,404 | 5/1989 | Sugawa et al. | 250/578 |
| 4,914,519 | 4/1990 | Hashimoto et al. | 358/213.18 |
| 4,967,067 | 10/1990 | Hashimoto et al. | 250/208.1 |

FOREIGN PATENT DOCUMENTS

0260954 3/1988 United Kingdom.
0302675 2/1989 United Kingdom.

Primary Examiner—Michael Razavi
Assistant Examiner—Tuan V. Ho
Attorney, Agent, or Firm—Fitzpatrick, Cella, Harper & Scinto

[57] ABSTRACT

A photoelectric conversion apparatus includes a photoelectric conversion element, a first storage unit for storing a signal from the photoelectric conversion element, a second storage unit for storing noise from the photoelectric conversion element, a buffer unit for buffering output signals from the first and second storage units, a capacitor unit connected to the buffer unit, and a resetting unit connected to both sides of the capacitor unit.

6 Claims, 10 Drawing Sheets

PHOTOELECTRIC CONVERSION APPARATUS ELIMINATING NOISE IN AN OUTPUT SIGNAL

BACKGROUND OF THE INVENTION

1. Field of the Invention

The present invention relates to a photoelectric conversion apparatus and, more particularly, to a photoelectric conversion apparatus for removing noise included in a signal photoelectrically converted by a photoelectric conversion element.

2. Related Background Art

In a conventional photoelectric conversion apparatus, when a signal photoelectrically converted by a photoelectric conversion element is to be read out, an unnecessary component such as a dark signal or a drive noise from the photoelectric conversion element is often included in and output together with the readout signal. The dark signal is a dark current of a photosensor, and the drive noise is noise generated when the photosensor is driven to read out a signal.

In order to remove these noise components from a photoelectric conversion element, the assignee of the present invention proposed a photoelectric conversion apparatus having the following arrangement in Japanese Patent Application No. 62-279390.

Figure 1:
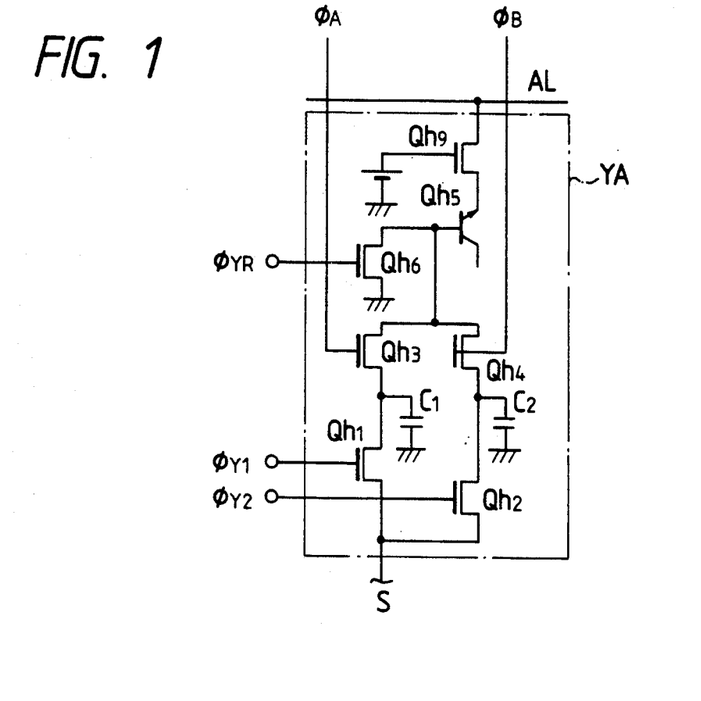
FIG. 1 is a partial circuit diagram showing an arrangement of a photoelectric conversion apparatus disclosed in Japanese Patent Application No. 62-279390.

FIG. 1 is a partial circuit diagram showing an arrangement of the above photoelectric conversion apparatus.

Referring to FIG. 1, noise from a photoelectric conversion on element is stored in a capacitor $C_1$ via a MOS transistor $Qh_1$, and a signal from the photoelectric conversion element is stored in a capacitor $C_2$ via a MOS transistor $Qh_2$.

The stored noise and signal are sequentially transferred, via a buffer amplifier $Qh_5$ and a MOS transistor $Qh_9$, to an output signal line AL by MOS transistors $Qh_3$ and $Qh_4$ controlled by pulses $\phi_A$ and $\phi_B$, respectively. Thereafter, the noise is removed from the signal. Since a signal and noise are passed through the same amplifier $Qh_5$ to remove the noise such as fixed pattern noise from the signal, noise from the photoelectric conversion element and offset noise generated by the amplifier can be simultaneously removed.

The assignee of the present invention also proposed a photoelectric conversion apparatus having the following arrangement in Japanese Patent Application No. 63-72112.

Figure 2:
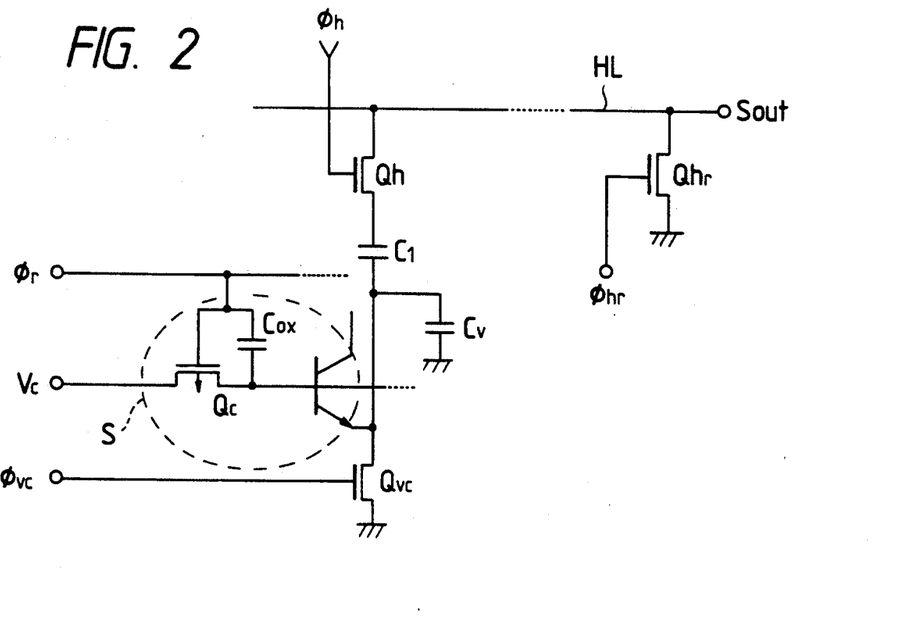
FIG. 2 is a partial circuit diagram showing an arrangement of a photoelectric conversion apparatus disclosed in Japanese Patent Application No. 63-72112.

FIG. 2 is a partial circuit diagram showing an arrangement of the above photoelectric conversion apparatus.

First, as shown in FIG. 2, MOS transistors Qh and Qhr are turned on, one terminal of a capacitor $C_1$ is grounded, and a MOS transistor $Q_{VC}$ is turned off, thereby floating the emitter of a photoelectric conversion element S. As a result, noise from the photoelectric conversion element is stored in the capacitor $C_1$ and a capacitor $C_V$. Assume that a potential obtained in this state is Vn. A signal is stored in the base of the photoelectric conversion element S, and a pulse $\phi_{VC}$ during a storage period is raised to clear the capacitor $C_V$. At this time, the potential changes from Vn to GND. If the transistors Qh and Qhr are kept OFF, the potential at the output side of the capacitor $C_1$ is $-Vn$.

The signal from the photoelectric conversion element S is transferred to and stored in the capacitor $C_V$. At this time, the potential rises from GND by Vs. Meanwhile, the potential at the output side of the capacitor $C_1$ rises from $-Vn$ by Vs.

By turning on the transistor Qh, a signal from which noise components are removed can be output.

Of the above two photoelectric conversion apparatuses, however, the former photoelectric conversion apparatus must comprise a high-precision and high-speed clamp circuit and a sample-and-hold circuit as external circuits in order to remove noise from the photoelectric conversion element and offset noise from a point sequential signal. In addition, it is difficult to apply an IC arrangement to the entire apparatus. Furthermore, in order to incorporate these circuits in a single chip, positive and negative pulses must be used for the clamp or the sample-and-hold circuit.

In the latter photoelectric conversion apparatus, when an output signal is passed through the buffer amplifier, offset noise generated by the amplifier is superposed on the signal.

SUMMARY OF THE INVENTION

It is an object of the present invention to provide a noise correction circuit, a photoelectric conversion apparatus, and a subtractor suitable for an IC arrangement, which can remove both noise from a photoelectric conversion element and offset noise from a buffer amplifier.

A photoelectric conversion apparatus according to an embodiment of the present invention, comprises: a photoelectric conversion element; first storage means for storing a signal from the photoelectric conversion element; second storage means for storing noise from the photoelectric conversion element; buffer means for buffering output signals from the first and second storage means; capacitor means connected to the buffer means; and resetting means connected to both sides of the capacitor means.

According to the above embodiment, the output side of the capacitor means is reset to be a predetermined potential (in this case, GND) by the resetting means provided at the output side of the capacitor means, and noise from the photoelectric conversion element is transferred from the second storage means to the capacitor means via the buffer means (in this case, a potential is Vn).

After the output side of the capacitor means is floated, the input side of the capacitor is reset to be a predetermined potential (in this case, GND) by the resetting means provided at the input side of the capacitor means. At this time, the potential at the input side of the capacitor means changes from Vn to GND, and that at the output side of the capacitor means changes from GND to $-Vn$.

A signal from the photoelectric conversion element is transferred from the first storage means to the capacitor means via the buffer means (in this case, a potential is Vs). At this time, the potential at the input side of the capacitor means changes from GND to Vs, and that at the output side of the capacitor means rises by Vs from $-Vn$ to $Vs-Vn$.

In this manner, noise from the photoelectric conversion element can be removed. At the same time, noise from the buffer means can be removed since a subtraction is performed after both the noise components from the signal and the photoelectric conversion element are passed through the same buffer means.

A noise correction circuit according to an embodiment of the present invention, comprises: buffer means for receiving a signal via first switching means and receiving a predetermined voltage via second switching means; charge storage means connected to an output side of the buffer means; and resetting means connected to input and output sides of the charge storage means.

A photoelectric conversion apparatus according to an embodiment of the present invention, comprises: a plurality of buffer means each for receiving a sensor signal via first switching means and receiving a predetermined voltage via second switching means; a plurality of output lines each connected to a corresponding one of the buffer means; a plurality of charge storage means each connected to a corresponding one of the output lines; and resetting means connected to input and output sides of each of the charge storage means.

The noise correction circuit according to the embodiment having the above arrangement removes noise of the buffer means by the following operation.

The output side of the charge storage means connected in series with the buffer means is set at a predetermined potential ($V_{GN}$) by the resetting means, and the second switching means is turned on to store an electrical charge via the buffer means, thereby setting a potential at the input side of the charge storage means to be a potential ($V_B+V_N$) obtained by adding a noise component ($V_N$) of the buffer means to a predetermined potential ($V_B$). Note that the input side of the charge storage means may be set at a predetermined potential ($V_I$) beforehand to obtain a potential of $V_B+V_N+V_I$. In this embodiment, however, $V_I$ is set as $V_I=0$.

The output side of the charge storage means is then opened and floated, and the first switching means is turned on to apply a signal voltage ($V_S+V_N$) obtained by adding the noise component ($V_N$) of the buffer means to a signal voltage $V_S$ to the input side of the charge storage means. At this time, a potential variation at the input side of the charge storage means is represented by $(V_S+V_N)-(V_B+V_N)=V_S-V_B$ (note that $V_S-V_B>0$). Meanwhile, the potential at the output side of the charge storage means rises by $V_S-V_B$ to be $V_{GN}+V_S-V_B$ in accordance with the variation at the input side. In this manner, the noise component $V_N$ generated by the buffer means is removed.

The photoelectric conversion apparatus of the present invention obtains a sensor signal from which noise generated by the buffer means is removed by using the above noise correction circuit.

A subtractor according to an embodiment of the present invention, comprises: first switching means connected to a first signal source; second switching means connected to a second signal source; and capacitor means commonly connected to output sides of the first and second switching means, wherein a signal of one of the first and second signal sources is output to the capacitor means, and then a signal from the other signal source is output to the capacitor means, thereby extracting a difference signal of the signals from the first and second signal sources from an output side of the capacitor means.

In the subtractor having the above arrangement, the first switching means connected to the first signal source is used to output a signal from the first signal source to the capacitor means (in this case, a potential of the capacitor means is V1), and a reference potential at the output side of the capacitor means is set to be, e.g., GND.

Thereafter, the second switching means connected to the second signal source is used to output a signal from the second signal source to the capacitor means (in this case, the potential of the capacitor means is V2). As a result, a potential variation at the input side of the capacitor means becomes V2−V1. Meanwhile, the potential at the output side of the capacitor means varies from the reference potential to V2−V1. That is, a difference signal representing a difference between the signals from the first and second signal sources can be output from the output side of the capacitor means.

The other objects and features of the present invention will become apparent from the following description in conjunction with the accompanying drawings.

DESCRIPTION OF THE PREFERRED EMBODIMENTS

An embodiment of a photoelectric conversion apparatus according to the present invention will be described in detail below with reference to the accompanying drawings.

Figure 3:
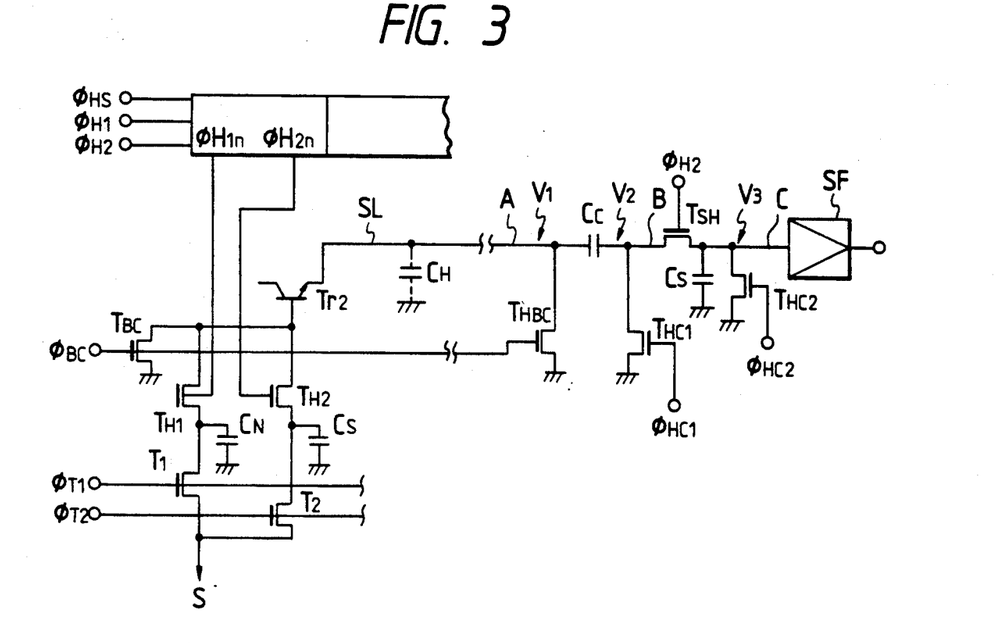
FIG. 3 is a schematic circuit diagram showing an arrangement of a photoelectric conversion apparatus of the present invention.

FIG. 3 is a schematic circuit diagram showing an embodiment of a photoelectric conversion apparatus according to the present invention.

As shown in FIG. 3, a photoelectric conversion element S is connected to a capacitor $C_N$ via a transistor $T_1$ and is connected to a capacitor $C_S$ via a MOS transistor $T_2$. The capacitors $C_N$ and $C_S$ are connected to a buffer amplifier $Tr_2$ and a MOS transistor $T_{BC}$ controlled by a pulse $\phi_{BC}$ via MOS transistors $T_{H1}$ and $T_{H2}$ controlled by a shift register. The shift register is controlled by pulses $\phi_{HS}$, $\phi_{H1}$, and $\phi_{H2}$.

An output from the buffer amplifier $Tr_2$ is transferred to an output signal line SL. Note that the output signal line SL has a parasitic capacitance $C_H$. A portion A at the output signal line SL side is reset by a MOS transistor $T_{HBC}$ controlled by a pulse $\phi_{BC}$.

The output signal line SL is connected to a MOS transistor $T_{SH}$ controlled by a pulse $\phi_{H2}$ and a MOS transistor $T_{HC1}$ controlled by a pulse $\phi_{HC1}$ via a coupling capacitor $C_C$. The MOS transistor $T_{HC1}$ resets a portion B at the output side of the coupling capacitor $C_C$. The MOS transistor $T_{SH}$ is further connected to a capacitor $C_S$ and a MOS transistor $T_{HC2}$. The MOS transistor $T_{HC2}$ resets a portion C at the output side of the MOS transistor $T_{SH}$.

An operation of the photoelectric conversion apparatus having the above operation will be described below with reference to FIG. 4.

Figure 4:
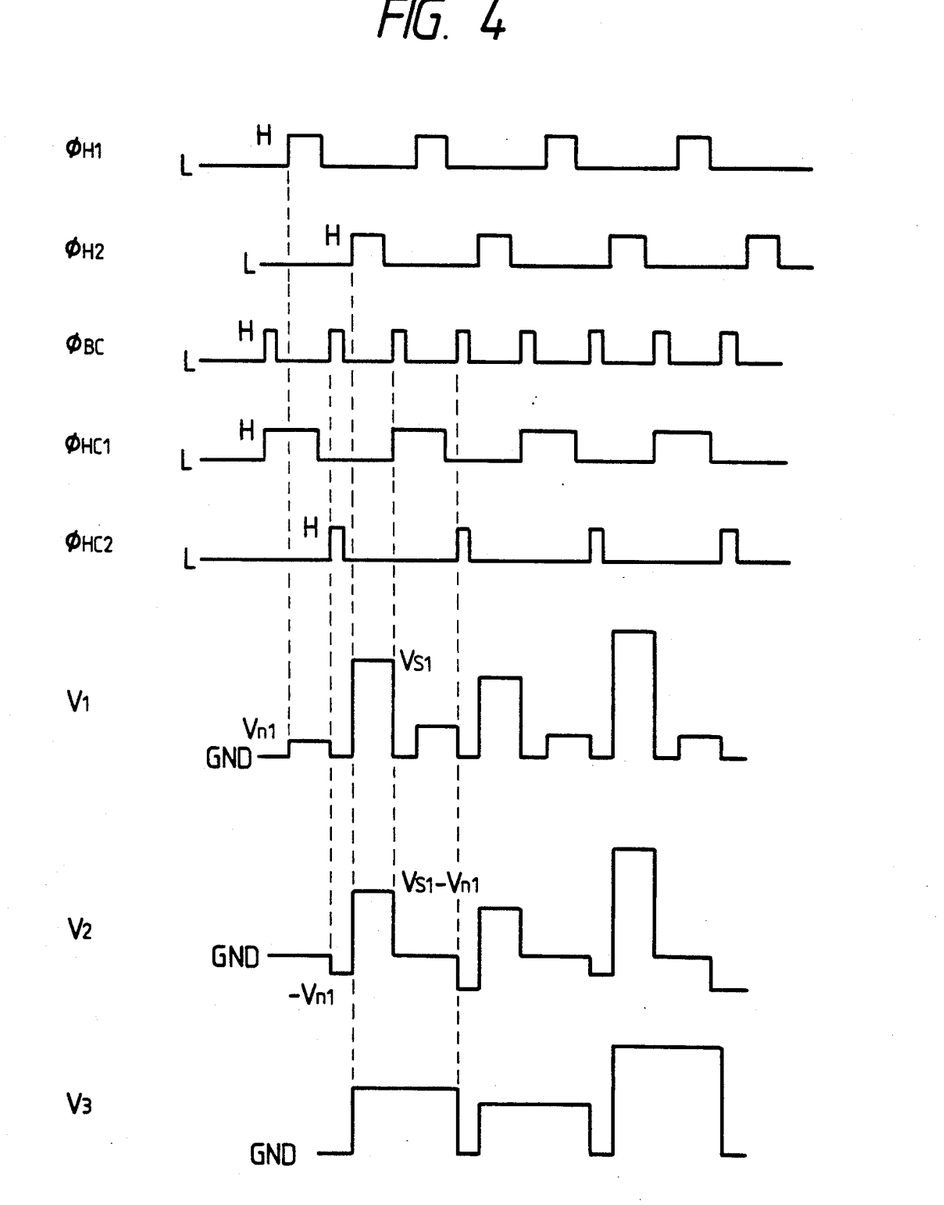
FIG. 4 is a timing chart for explaining an operation of the photoelectric conversion apparatus shown in FIG. 3.

FIG. 4 is a timing chart for explaining the operation of the above photoelectric conversion apparatus.

Noise from the photoelectric conversion element S is stored in the capacitor $C_N$ via the MOS transistor $T_1$ under the control of a pulse $\phi_{T1}$. A signal from the photoelectric conversion element S is stored in the capacitor $C_S$ via the MOS transistor $T_2$ under the control of a pulse $\phi_{T2}$.

When the pulse $\phi_{H1}$ goes to high level, the MOS transistor $T_{H1}$ is turned on, and the noise stored in the capacitor $C_N$ is stored in the coupling capacitor $C_C$ via the MOS transistor $T_{H1}$ and the buffer amplifier $Tr_2$. Since the pulse $\phi_{HC1}$ is at high level and the MOS transistor $T_{HC1}$ is kept ON, a potential of the portion B at the output side of the coupling capacitor $C_C$ is kept at GND. Therefore, while a potential $V_2$ of the portion B is at GND, a noise voltage of $+Vn_1$ is stored as a potential $V_1$ of the portion A of the output signal line SL.

The pulse $\phi_{HC1}$ is switched to low level, and the MOS transistor $T_{HC1}$ is turned off, thereby floating the portion B. In addition, the pulse $\phi_{BC}$ is switched to high level, and the MOS transistor $T_{HBC}$ is turned on, thereby decreasing the potential of the portion A from the noise voltage of $+Vn_1$ to GND. At this time, a noise voltage of $-Vn_1$ having a polarity opposite to that of the noise voltage of $+Vn_1$ appears as the potential $V_2$ of the portion B.

The pulse $\phi_{BC}$ is switched to low level, and the MOS transistor $T_{HBC}$ is turned off. Thereafter, by switching the pulse $\phi_{H2}$ to high level, the MOS transistor $T_{H2}$ is turned on, and the signal stored in the capacitor $C_S$ is transferred to the coupling capacitor $C_C$ via the MOS transistor $T_{H2}$ and the buffer amplifier $Tr_2$.

At this time, the potential of the portion A rises from GND to a signal voltage of $Vs_1$. In accordance with the potential rise in the portion A, the potential of the portion B rises by the potential $Vs_1$ from a noise voltage of $-Vn_1$ to a potential of $Vs_1-Vn_1$, i.e., a potential including only signal components obtained by canceling noise voltage components. That is, the sensor noise and the buffer amplifier noise are cancelled.

Since the sample-and-hold MOS transistor $T_{SH}$ is turned on when the voltage $Vs_1-Vn_1$ appears in the portion B, a voltage $V_3$ appears in the portion C. By sampling and holding, a signal having a high duty ratio and free from noise components can be obtained.

Figure 5:
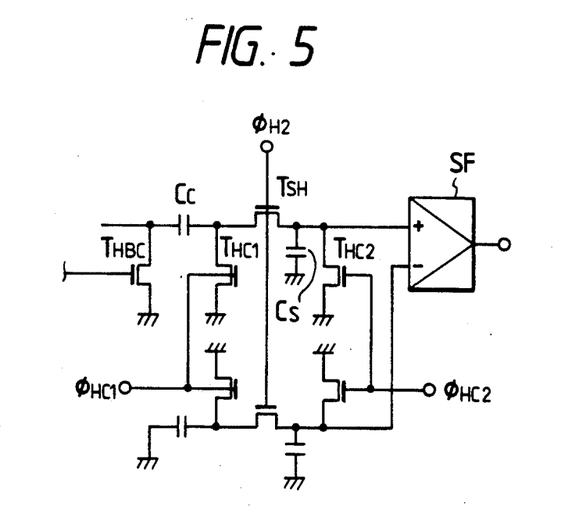
FIG. 5 is a partial circuit diagram showing a photoelectric conversion apparatus of the present invention including a removing circuit for a pulse leakage component.

FIG. 5 is a partial circuit diagram showing a photoelectric conversion apparatus according to the present invention including a pulse leakage component removing circuit.

Referring to FIG. 5, when a MOS transistor or the like is pulse-driven, a pulse leakage component is generated due to capacitance division of a pulse caused by the gate capacitance or an overlap capacitance between the source (drain) and the gate of the MOS transistor and a signal line capacitance. The pulse leakage component is also generated by a parasitic capacitance between pulse wiring and a signal line. As shown in FIG. 5, such a leakage component can be removed by arranging a circuit having the same arrangement as that of a signal reading circuit in parallel with the signal reading circuit to perform differential processing.

A practical arrangement of an image reader to which the present invention is applied will be described below.

Figure 6:
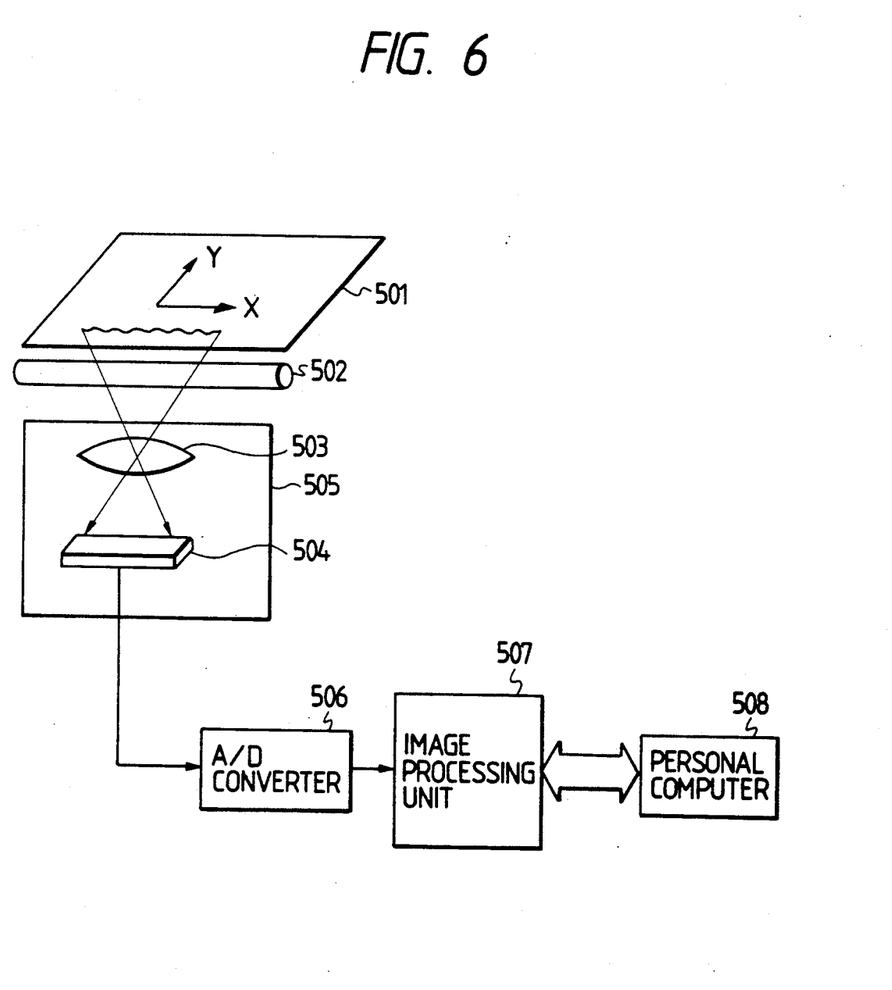
FIG. 6 is a schematic block diagram showing an arrangement of an image reader.

FIG. 6 is a schematic block diagram showing the arrangement of the image reader.

Referring to FIG. 6, an original 501 is mechanically moved relative to a reading unit 505 in a direction indicated by an arrow Y. Image reading is performed by scanning in a direction indicated by an arrow X by an image sensor 504 as a photoelectric conversion apparatus of the present invention.

Light from a light source 502 is reflected by the original 501, and the reflected light forms an image on the image sensor 504 through an imaging optical system 503. The image sensor 504 stores carriers corresponding to the intensity of the incident light and outputs the carriers as a photoelectrically converted image signal.

This image signal is digital-converted by an A/D converter 506 and fetched as image data in an internal memory of an image processing unit 507. The fetched data is subjected to, e.g., shading correction and color correction and transmitted to a personal computer 508, a printer, or the like.

When image signal transfer of X-direction scanning is finished in this manner, the original 501 is moved relatively in the Y direction, and the above operation is repeatedly performed, thereby converting the total image of the original 501 into an electrical signal and extracting the signal as image information.

In the above embodiment, the present invention is applied to an image reader using a line sensor. The present invention, however, can be applied to not only a line sensor but also, e.g., an area sensor.

As has been described above in detail, according to the photoelectric conversion apparatus, noise included in a signal from a photoelectric conversion element and offset noise generated by a buffer amplifier in a read system can be removed in a single chip.

In addition, by noise removal of a coupling capacitance system provided at the output side of the buffer amplifier, a bipolar transistor portion is included between the photoelectric conversion element and the buffer amplifier. Therefore, even if a bias voltage is applied, the bias voltage can be cancelled.

Furthermore, since a sample-and-hold circuit is included, only a sensor signal having a high S/N ratio can be output.

An embodiment of a noise correction circuit according to the present invention will be described in detail below with reference to the accompanying drawings.

Although an application of the noise correction circuit of the present invention is not limited to a photoelectric conversion apparatus, a photoelectric conversion apparatus will be exemplified as a suitable application.

Figure 7:
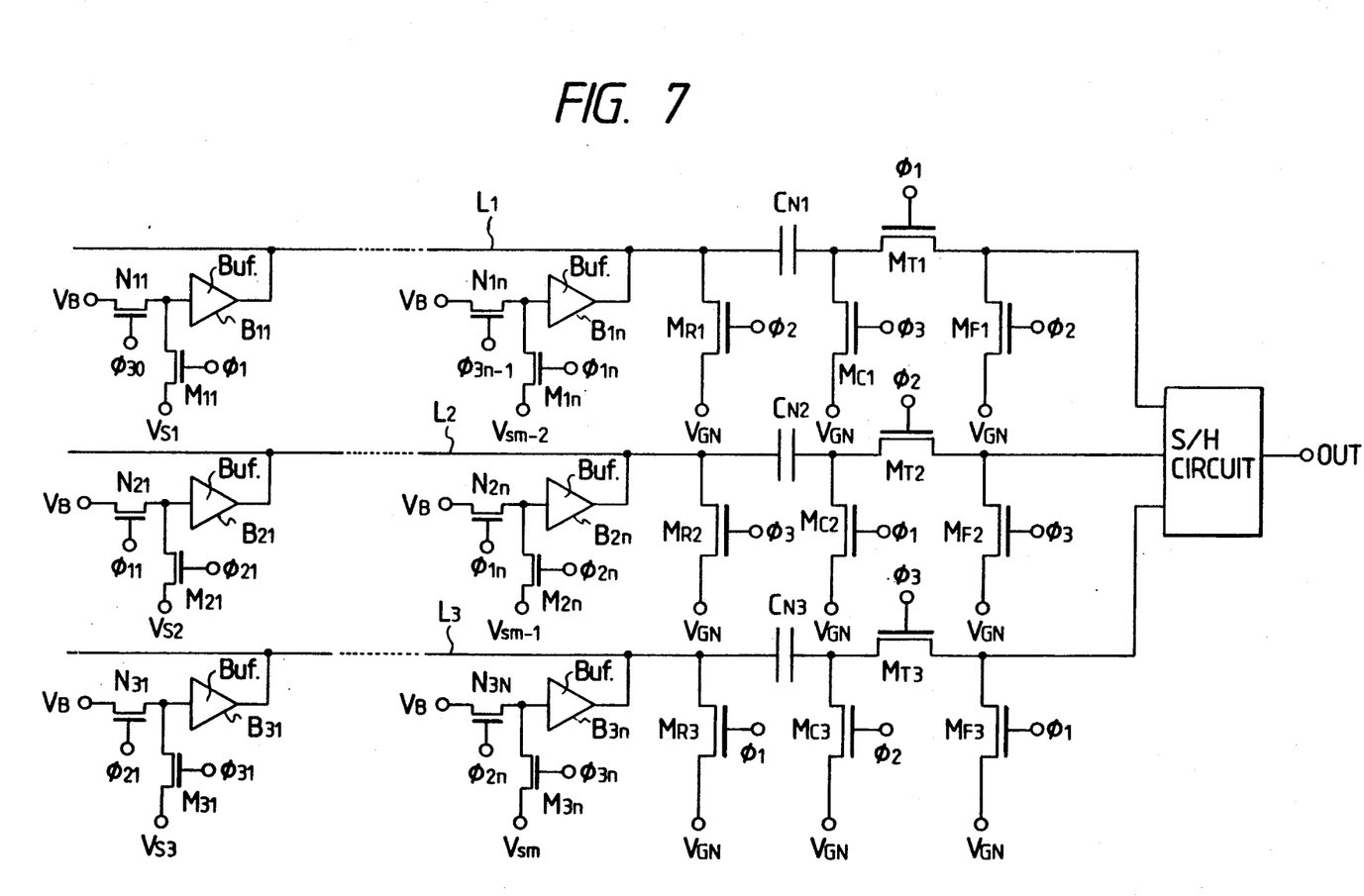
FIG. 7 is a circuit diagram showing an embodiment of a noise correction circuit used in the photoelectric conversion apparatus of the present invention.

FIG. 7 is a circuit diagram showing an arrangement of the noise correction circuit used in the photoelectric conversion apparatus of the present invention.

FIG. 7 shows an arrangement of a circuit for reading out a sensor signal from a photoelectric conversion unit having m pixels via a buffer amplifier as a buffer means.

Referring to FIG. 7, output lines $L_1$, $L_2$, and $L_3$ are connected to buffer amplifiers $B_{11}$ to $B_{1n}$, $B_{21}$ to $B_{2n}$, and $B_{31}$ to $B_{3n}$, respectively, each corresponding to m/3 pixels. Transistors $M_{11}$ to $M_{1n}$ (n=m/3) are connected to the input sides of the buffer amplifiers $B_{11}$ to $B_{1n}$ which are connected to the output line $L_1$, respectively. Transistors $M_{21}$ to $M_{2n}$ (n=m/3) are connected to the input sides of the buffer amplifiers $B_{21}$ to $B_{2n}$ which are connected to the output line $L_2$, respectively. Transistors $M_{31}$ to $M_{3n}$ (n=m/3) are connected to the input sides of the buffer amplifiers $B_{31}$ to $B_{3n}$ which are connected to the output line $L_3$, respectively.

The transistors $M_{11}$ to $M_{1n}$, $M_{21}$ to $M_{2n}$, and $M_{31}$ to $M_{3n}$ are ON/OFF-controlled by pulses $\phi_{11}$ to $\phi_{1n}$, $\phi_{21}$ to $\phi_{2n}$, and $\phi_{31}$ and $\phi_{3n}$, respectively.

Sensor signals $V_{s1}$ to $V_{sm}$ of the respective signals are selected by the pulses $\phi_{11}$ to $\phi_{1n}$, $\phi_{21}$ to $\phi_{2n}$, and $\phi_{31}$ to $\phi_{3n}$ and output to the output lines $L_1$ to $L_3$ via the transistors $M_{11}$ to $M_{1n}$, $M_{21}$ to $M_{2n}$, and $M_{31}$ to $M_{3n}$ and the buffer amplifiers $B_{11}$ to $B_{1n}$, $B_{21}$ to $B_{2n}$, and $B_{31}$ to $B_{3n}$ which are connected to these transistors.

Transistors $N_{11}$ to $N_{1n}$ are connected to the input sides of the buffer amplifiers $B_{11}$ to $B_{1n}$, respectively, transistors $N_{21}$ to $N_{2n}$ are connected to the input sides of the buffer amplifiers $B_{21}$ to $B_{2n}$, respectively, and transistors $N_{31}$ to $N_{3n}$ are connected to the input sides of the buffer amplifiers $B_{31}$ to $B_{3n}$, respectively. The transistors $N_{11}$ to $N_{1n}$, $N_{21}$ to $N_{2n}$, and $N_{31}$ to $N_{3n}$ are ON/OFF-controlled by pulses $\phi_{30}$ to $\phi_{3n-1}$, $\phi_{11}$ to $\phi_{1n}$, and $\phi_{21}$ to $\phi_{2n}$, respectively. A reference voltage $V_B$ can be applied to the input sides of the buffer amplifiers $B_{21}$ to $B_{2n}$ via the transistors $N_{11}$ to $N_{1n}$, $N_{21}$ to $N_{2n}$, and $N_{31}$ to $N_{3n}$, respectively.

Capacitors $C_{N1}$, $C_{N2}$, and $C_{N3}$ are connected in series with the output stages of the output lines $L_1$, $L_2$, and $L_3$, respectively, and the input sides of the capacitors $C_{N1}$, $C_{N2}$, and $C_{N3}$ are connected to reset power sources via transistors, $M_{R1}$, $M_{R2}$, and $M_{R3}$, respectively, so that a reset voltage $V_{GN}$ can be applied thereto. The transistors $M_{R1}$, $M_{R2}$, and $M_{R3}$ are ON/OFF-controlled by output read pulses $\phi_2$, $\phi_3$, and $\phi_1$, respectively.

The output sides of the capacitors $C_{N1}$, $C_{N2}$, and $C_{N3}$ are connected to a sample-and-hold circuit (S/H circuit) via transistors $M_{T1}$, $M_{T2}$, and $M_{T3}$, respectively. The transistors $M_{T1}$, $M_{T2}$, and $M_{T3}$ are controlled by the output read pulses $\phi_1$, $\phi_2$, and $\phi_3$, respectively, and the signal charges stored in the capacitors $C_{N1}$, $C_{N2}$, and $C_{N3}$ are read out to the S/H circuit under the control of the output read pulses $\phi_1$, $\phi_2$, and $\phi_3$, respectively.

The output sides of the capacitors $C_{N1}$, $C_{N2}$, and $C_{N3}$ are connected to reset power sources via transistors $M_{C1}$, $M_{C2}$, and $M_{C3}$, respectively, so that the reset voltage $V_{GN}$ can be applied thereto. The transistors $M_{C1}$, $M_{C2}$, and $M_{C3}$ are ON/OFF-controlled by the output read pulses $\phi_3$, $\phi_1$, and $\phi_2$, respectively.

The output sides of the transistors $M_{T1}$, $M_{T2}$, and $M_{T3}$ are connected to reset power sources via transistors $M_{F1}$, $M_{F2}$, and $M_{F3}$, respectively, so that the reset voltage $V_{GN}$ can be applied thereto. The transistors $M_{F1}$, $M_{F2}$, and $M_{F3}$ are ON/OFF-controlled by the output read pulses $\phi_2$, $\phi_3$, and $\phi_1$, respectively.

An operation of the noise correction circuit having the above arrangement will be described below.

Figure 8:
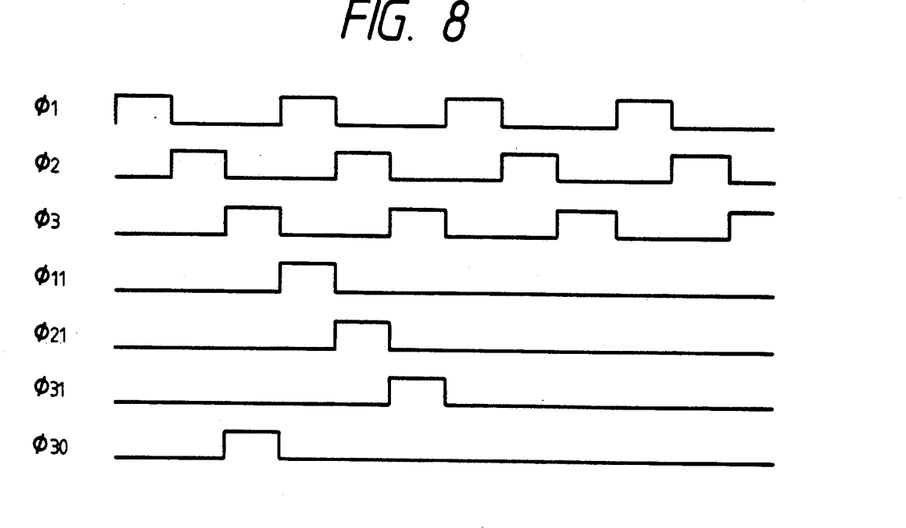
FIG. 8 is a timing chart for explaining an operation of the noise correction circuit shown in FIG. 7.

FIG. 8 is a timing chart for explaining an operation of the noise correction circuit.

As has been described above with reference to FIG. 7, the pulses $\phi_1$, $\phi_2$, and $\phi_3$ ON/OFF-control the transistors $M_{T1}$, $M_{T2}$, and $M_{T3}$ to select the output lines $L_1$, $L_2$, and $L_3$, respectively, and ON/OFF-control the transistors $M_{R1}$ to $M_{R3}$, $M_{C1}$ to $M_{C3}$, and $M_{F1}$ to $M_{F3}$ to reset the output lines $L_1$, $L_2$, and $L_3$, respectively. Pulses $\phi_{11}$, $\phi_{21}$, $\phi_{31}$, and $\phi_{30}$ are some of the pulses output from a scanning circuit in synchronism with the pulses $\phi_1$, $\phi_2$, and $\phi_3$, and only one of them is output during one sensor operation cycle.

With reference to a timing chart shown in FIG. 8, a noise correction read operation of an input signal $V_{S1}$ to the output line $L_1$ will be described below. First, the transistor $N_{11}$ is turned on by the pulse $\phi_{30}$ to input a predetermined voltage $V_B$ to the buffer amplifier $B_{11}$. At the same time, the transistor $M_{C1}$ is turned on by the pulse $\phi_3$ to set the output side of the capacitor $C_{N1}$ at a fixed voltage $V_{GN}$. Assuming that a signal including a noise component output via the buffer amplifier $B_{11}$ is $V_B+V_N$, the capacitor $C_{N1}$ holds a potential of $V_B+V_N$. When the transistor $M_{11}$ is turned on by the pulse $\phi_{11}$ to input the sensor signal $V_{S1}$ to the buffer amplifier $B_{11}$, a noise component at the same level as that obtained when the predetermined voltage $V_B$ is input via the buffer amplifier $B_{11}$ is generated as $V_{S1}+V_N$. At the same time this signal $V_{S1}+V_N$ is output from the buffer amplifier $B_{11}$, the transistor $M_{C1}$ is turned off by the pulse $\phi_3$ to float the capacitor $C_{N1}$. At this time, a signal change in the capacitor $C_{N1}$ is as follows. That is, at the beginning, a potential $V_B+V_N$ is held at the input side of the capacitor $C_{N1}$, while the potential $V_{GN}$ is held at its output side. When the signal of $V_{S1}+V_N$ is applied, a potential change at the input side of the capacitor $C_{N1}$ is $V_{S1}-V_B$, while the potential at its output side changes by $V_{S1}-V_B$ to be $V_{S1}-V_B+V_{GN}$, thereby removing the noise component $V_N$ generated by the buffer amplifier $B_{11}$. Since the transistor $M_{T1}$ is kept ON by the pulse $\phi_1$, the signal having the potential $V_{S1}-V_B+V_{GN}$ is input to the S/H circuit. Thereafter, the transistors $M_{R1}$ and $M_{F1}$ are turned on by the pulse $\phi_2$, and the potentials of the respective wiring portions are reset to prepare for the next signal reading.

The above series of operations are similarly performed for the output lines $L_2$ and $L_3$. As is apparent from the timing chart in FIG. 8, the output signals are supplied to the S/H circuit in the order of the pulses $\phi_1$, $\phi_2$, and $\phi_3$ and extracted as continuous signals. In this embodiment, an output line is divided into three or more lines, and scanning pulses and output read pulses of the respective lines are efficiently combined. Therefore, a noise correction operation can be performed by using the same number of pulses as that used in a circuit not having a noise correction circuit, and the signal processing can be efficiently performed within a short time period.

Note that in the above embodiment, the potential $V_B$ is preferably set to be a value at which the same noise as that generated when the signal is input to a buffer amplifier is generated by the buffer amplifier. In the above embodiment, however, the potential $V_B$ may be a potential at the same level as a dark signal level of the sensor.

As has been described above in detail, according to the noise correction circuit of the present invention, noise generated by the buffer means can be removed by a simple circuit arrangement.

A photoelectric conversion apparatus using the present invention can prevent gain reduction in an output unit and improve a read time efficiency by using the above noise correction circuit.

An embodiment of a subtractor according to the present invention will be described in detail below with reference to the accompanying drawings.

Figure 9:
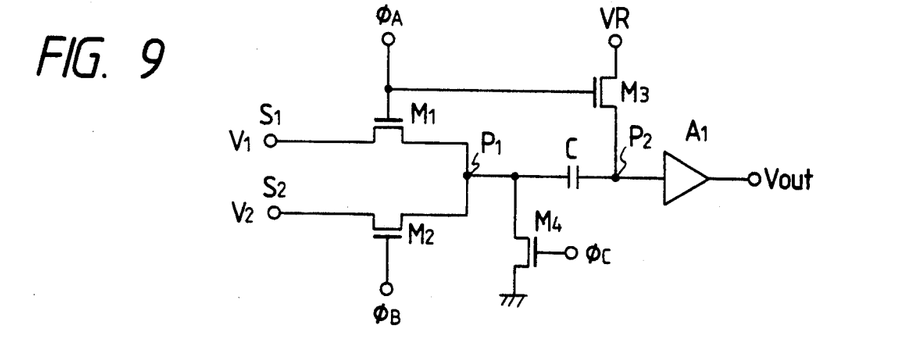
FIG. 9 is a circuit diagram for explaining a basic arrangement of a subtractor of the present invention.

FIG. 9 is a circuit diagram for explaining a basic arrangement of the subtractor of the present invention.

Referring to FIG. 9, this subtractor comprises a connection terminal $S_1$ connectable to a first signal source, a MOS transistor $M_1$ for ON/OFF-controlling a signal from the first signal source by using a clock $\phi_A$, a connection terminal $S_2$ connectable to a second signal source, and a MOS transistor $M_2$ for ON/OFF-controlling a signal from the second signal source by using a clock $\phi_B$.

The MOS transistors $M_1$ and $M_2$ are commonly connected at a node $P_1$ and then to a capacitor C. The capacitor C is connected to an output amplifier $A_1$. A terminal of the capacitor C at the node P side is connected to a MOS transistor $M_4$ which is ON/OFF-controlled by a clock $\phi_C$ so that a charge stored in the wiring and the capacitor can be reset. A terminal of the capacitor C at the output amplifier A side is connected at a node $P_2$ to a MOS transistor $M_3$ which is ON/OFF-controlled by the clock $\phi_A$ so that a reference potential ($V_R$) can be applied thereto.

An operation of the subtractor having the above arrangement will be described below.

Figure 10:
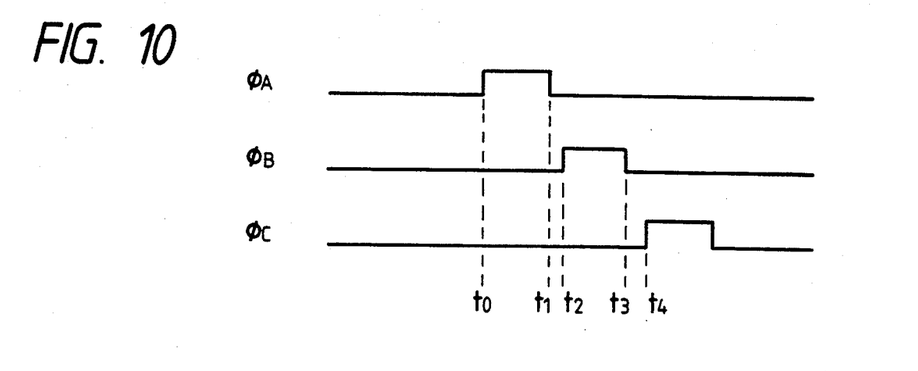
FIG. 10 is a timing chart for explaining an operation of the subtractor shown in FIG. 9.

FIG. 10 is a timing chart for explaining the operation of the above circuit.

Referring to FIG. 10, when the pulse $\phi_A$ rises at a timing t0 to turn on the MOS transistors $M_1$ and $M_3$, the signal voltage $V_1$ from the first signal source is read out to the node $P_1$ and at the same time the node $P_2$ is reset to the reference potential ($V_R$).

When the clock $\phi_A$ falls at a timing t1 to turn off the MOS transistors $M_1$ and $M_3$, the node $P_2$ is set in a high-impedance state.

When the clock $\phi_B$ rises at a timing t2 to turn on the MOS transistor $M_2$, the signal voltage $V_2$ (in this case, $V_2 > V_1$) from the second signal source is read out to the node $P_1$.

At this time, the potential at the node $P_1$ rises from $V_1$ to $V_2$, and the potential at the node $P_2$ rises from the reference potential $V_R$ by $(V_2 - V_1)$ due to the capacitor C provided between the contacts $P_1$ and $P_2$. Therefore, the amplifier $A_1$ outputs a signal corresponding to the difference signal $(V_2 - V_1)$.

When the clock $\phi_B$ falls at a timing t3 to turn off the MOS transistor $V_2$ and the clock $\phi_C$ rises at a timing t4 to turn on the MOS transistor $M_4$, charges stored in the wiring and the capacitor at the node $P_1$ side are reset to prepare for the next signal reading.

As an embodiment of the subtractor of the present invention, an embodiment in which the present invention is applied to a photoelectric conversion apparatus will be described below.

Figure 11:
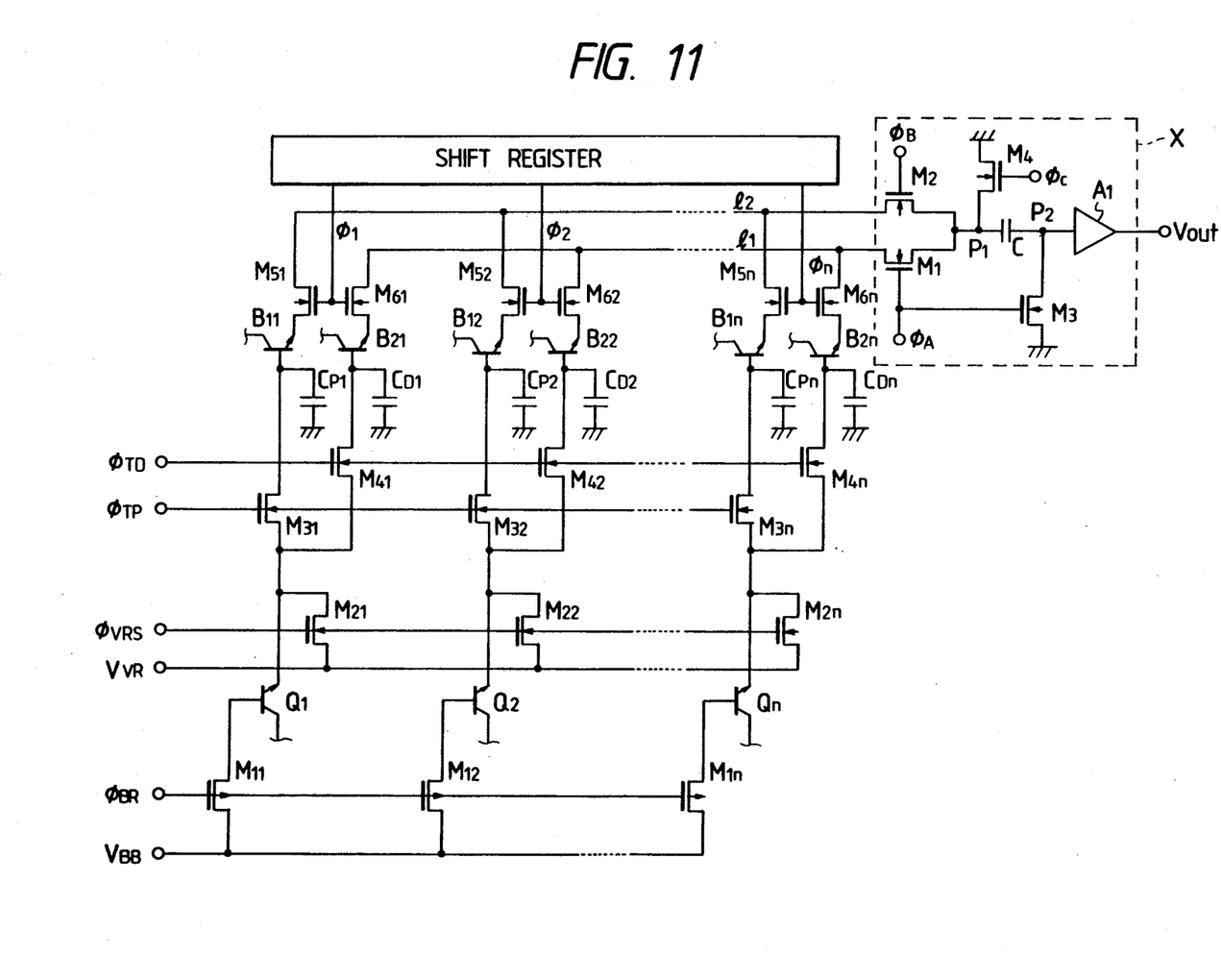
FIG. 11 is a circuit diagram of a photoelectric conversion apparatus showing an embodiment of the subtractor of the present invention.

FIG. 11 is a circuit diagram showing an arrangement of a photoelectric conversion apparatus using the subtractor of the present invention.

As shown in FIG. 11, MOS transistors $M_{11}$ to $M_{1n}$ are connected to the bases of sensor transistors $Q_1$ to $Q_n$, respectively, and a voltage $V_{BB}$ is applied thereto under ON/OFF control of a pulse $\phi_{BR}$. The emitters of the sensor transistors $Q_1$ to $Q_n$ are connected to MOS transistors $M_{21}$ to $M_{2n}$, respectively, and are further connected to capacitors $C_{P1}$ to $C_{Pn}$ and capacitors $C_{D1}$ to $C_{Dn}$ via MOS transistors $M_{31}$ to $M_{3n}$ and MOS transistors $M_{41}$ to $M_{4n}$, respectively.

The MOS transistors $M_{21}$ to $M_{2n}$ are ON/OFF-controlled by a pulse $\phi_{VRS}$ so that a voltage $V_{VR}$ can be applied to the emitters of the sensor transistors $Q_1$ to $Q_n$ respectively. The MOS transistors $M_{31}$ to $M_{3n}$ are ON/OFF-controlled by a pulse $\phi_{TP}$, and the MOS transistors $M_{41}$ to $M_{4n}$ are ON/OFF-controlled by a pulse $\phi_{TD}$. The capacitors $C_{P1}$ to $C_{Pn}$ and the capacitors $C_{D1}$ to $C_{Dn}$ are connected to MOS transistors $M_{51}$ to $M_{5n}$ and MOS transistors $M_{61}$ to $M_{6n}$ via buffers $B_{11}$ to $B_{1n}$ and buffers $B_{21}$ to $B_{2n}$, respectively. The gates of the MOS transistors $M_{51}$ and $M_{61}$, $M_{52}$ and $M_{62}$, ..., $M_{5n}$ and $M_{6n}$ are commonly connected and sequentially scanned by a shift register. By sequentially controlling the shift register, the signals stored in the capacitors $C_{P1}$ and $C_{D1}$, $C_{P2}$ and $C_{D2}$, ..., $C_{Pn}$ and $C_{Dn}$ are transferred onto horizontal transfer lines $l_1$ and $l_2$.

The horizontal transfer lines $l_1$ and $l_2$ are connected to a subtractor unit X. Note that the subtractor unit X is equivalent to the subtractor described above except that the reference potential $V_R$ is GND in the unit X. In the subtractor unit X, the same reference symbols as in the above subtractor denote the same parts and a detailed description thereof will be omitted.

Figure 12:
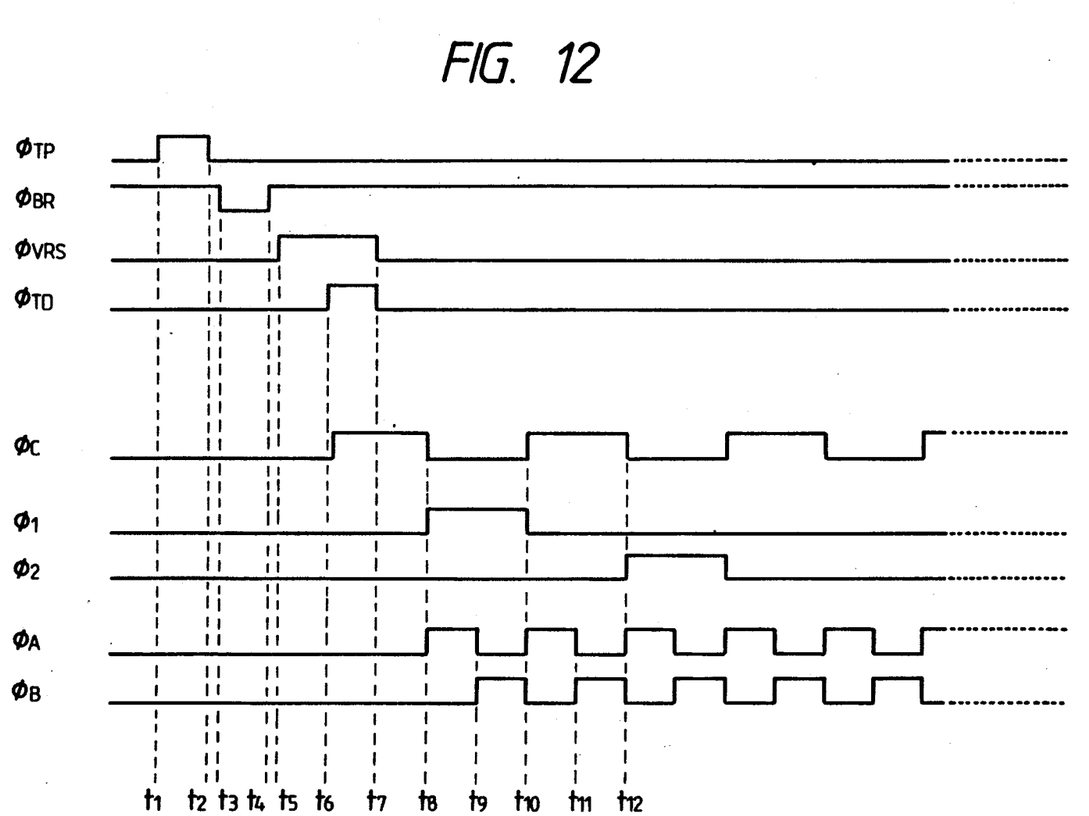
FIG. 12 is a timing chart for explaining the embodiment of the subtractor shown in FIG. 11.

FIG. 12 is a timing chart for explaining an operation of the above circuit.

At a timing t1, a clock $\phi_{TP}$ rises to turn on the MOS transistors $M_{31}$ to $M_{3n}$, and storage end timing signals (including fixed pattern noise) are simultaneously transferred to the temporary storage capacitors CP1 to CPn for all the pixels.

When the clock $\phi_{TP}$ falls to turn off the MOS transistors $M_{31}$ to $M_{3n}$ at a timing t2 and a clock $\phi_{BR}$ falls to turn on the transistors $M_{11}$ to $M_{1n}$ at a timing t3, the base potentials of the sensor transistors $Q_1$ to $Q_n$ are reset to be $V_{BB}$ for all the pixels (this is called a perfect reset operation).

When the clock $\phi_{BR}$ rises to turn off the transistors $M_{11}$ to $M_{1n}$ at a timing t4 and a clock $\phi_{VRS}$ rises to turn on the transistors $M_{21}$ to $M_{2n}$ at a timing t5, the emitter potentials of the sensor transistors $Q_1$ to $Q_n$ are reset to be $V_{VR}$ (this is called a transition reset operation).

From a timing t6 to a timing t7 during this transition reset operation, a clock $\phi_{TD}$ rises to turn on the transistors $M_{41}$ to $M_{4n}$, and the potential at the end of the transition reset operation, i.e., the potential at the start of the storage operation is transferred to the capacitors $C_{D1}$ to $C_{Dn}$.

Storage of new signals into the sensor transistors $Q_1$ to $Q_n$ is started at the timing t7, and the storage end timing signals (including the fixed pattern noise) transferred to the capacitors $C_{P1}$ to $C_{Pn}$ and $C_{D1}$ to $C_{Dn}$ and storage operation start timing outputs are sequentially output via the buffers $B_{11}$ and $B_{1n}$, the MOS transistors $M_{51}$ to $M_{5n}$, the horizontal transfer line $l_2$, the buffers $B_{21}$ to $B_{2n}$, the MOS transistors M61 to M6n, and the horizontal transfer line $l_1$, respectively.

An output operation of the storage end timing signal (including the fixed pattern noise) and the storage start timing output is performed as follows. That is, the shift register applies a clock $\phi_1$ to the MOS transistors $M_{51}$ and $M_{61}$, and carriers of the capacitors $C_{P1}$ and $C_{D1}$ are read out onto the horizontal transfer lines $l_2$ and $l_1$ via the buffers $B_{11}$ and $B_{21}$, respectively. By using the subtractor of the present invention described above, a differential signal obtained by subtracting a dark output from an optical signal is extracted.

Since the clock $\phi_A$ is at high level during the first half of the readout operation, i.e., between timings t8 to t9, the MOS transistors $M_1$ and $M_3$ are in an ON state. Therefore, the potentials at the nodes $P_1$ and $P_2$ are GND which is an output level upon storage start.

Since the clock $\phi_B$ is at high level during the second half of the readout operation, i.e., between timings t9 to t10, the MOS transistor $M_2$ is in an ON state, and the potential at the node $P_1$ changes from $V_N$ to $V_{S+N}$ (storage end timing signal level). At this time, since the node $P_2$ is in a floating state, the potential at the node $P_2$ rises from the GND level by the potential rise ($V_S$), and this level is finally output. Thereafter, at a timing t10, the clock $\phi_1$ from the shift register goes to low level and the clock $\phi_C$ rises. In the first half (timings t10 to t11) of the clock $\phi_C$, the clock $\phi_A$ goes to high level to turn on the transistors $M_1$ and $M_3$, and the nodes $P_1$ and $P_2$ and the horizontal transfer line $l_1$ are reset. In the second half (timings t11 to t12) of the clock $\phi_C$, the clock $\phi_B$ goes to high level to turn on the transistor $M_2$, and the horizontal transfer line $l_2$ is reset.

The above series of read operations are sequentially performed to output an optical signal for each pixel. In this case, even if the storage start timing output level varies for each pixel, only the storage end timing signal level not including the fixed pattern noise is output to the output terminal. Therefore, optical information having a high S/N ratio can be obtained.

Figure 13:
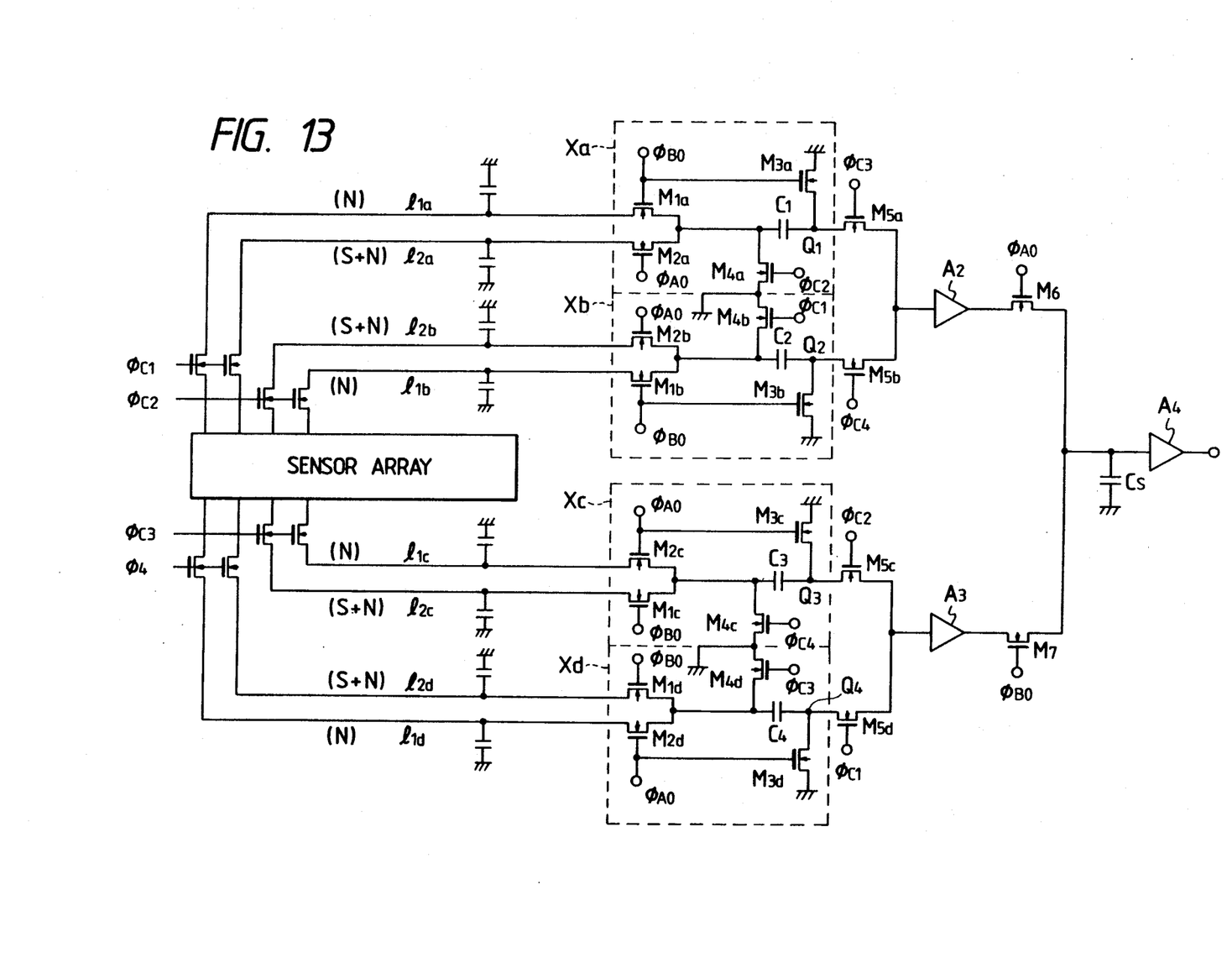
FIG. 13 is a circuit diagram of a photoelectric conversion apparatus showing another embodiment of the subtractor of the present invention.

FIG. 13 is a circuit diagram showing an arrangement of another photoelectric conversion apparatus using the subtractor of the present invention.

Figure 14:
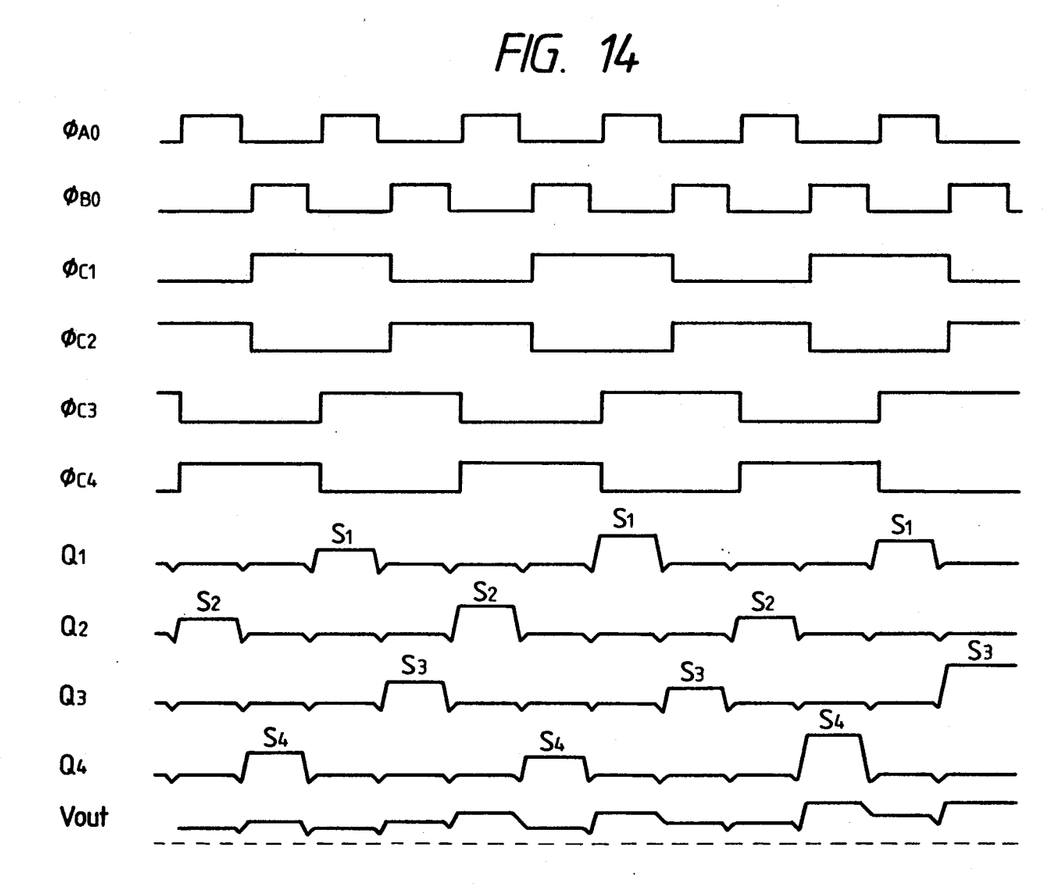
FIG. 14 is a timing chart for explaining the embodiment of the subtractor shown in FIG. 13.

FIG. 14 is a timing chart for explaining the basic arrangement of the subtractor.

As shown in FIG. 13, this embodiment is a photoelectric conversion apparatus of a 4-line read system in which outputs from pixels are divided into upper and lower stages, each of which is further divided into upper and lower stages.

A sensor unit and a subtractor unit of each line of four horizontal transfer lines are equivalent to those of the first embodiment, and detailed arrangements and operations thereof will be omitted.

As shown in FIGS. 13 and 14, clocks $\phi_{C1}$, $\phi_{C2}$, $\phi_{C3}$, and $\phi_{C4}$ are sequentially scanned to output a storage start timing output and a storage end timing signal to horizontal transfer lines $l_{1a}$ and $l_{2a}$, $l_{1b}$ and $l_{2b}$, $l_{1c}$ and $l_{2c}$, and $l_{1d}$ and $l_{2d}$, respectively.

Subtractor units $X_a$ to $X_d$ correspond to the subtractor unit X in the above embodiment shown in FIG. 11 except that no amplifier is included in these units. MOS transistors $M_{1a}$ to $M_{4a}$, $M_{1b}$ to $M_{4b}$, $M_{1c}$ to $M_{4c}$, and $M_{1d}$ to $M_{4d}$ correspond to the transistors $M_1$ to $M_4$, respectively, and capacitors $C_1$ to $C_4$ correspond to the capacitor C. Outputs from nodes $Q_1$ to $Q_4$ of the subtractor units $X_a$ to $X_d$ are connected to MOS transistors $M_{5a}$ to $M_{5d}$ which are ON/OFF-controlled by the clocks $\phi_{C3}$, $\phi_{C4}$, $\phi_{C2}$, and $\phi_{C1}$, respectively. The MOS transistors $M_{5a}$ and $M_{5b}$ are commonly connected via an amplifier $A_2$ to a MOS transistor $M_6$ which is ON/OFF-controlled by a clock $\phi_{A0}$. The MOS transistors $M_{5c}$ and $M_{5d}$ are commonly connected via an amplifier $A_3$ to a MOS transistor $M_7$ which is ON/OFF-controlled by a clock $\phi_{B0}$.

The MOS transistors $M_6$ and $M_7$ are commonly connected to a capacitor $C_S$ and an amplifier $A_4$.

The nodes $Q_1$, $Q_2$, $Q_3$, and $Q_4$ shown in FIG. 13 have potentials $Q_1$, $Q_2$, $Q_3$, and $Q_4$ shown in FIG. 14, respectively, and the amplifier $A_4$ outputs $V_{out}$.

In the embodiment shown in FIG. 11, an optical signal is output during a ¼ period of the clock $\phi_1$. In this embodiment shown in FIG. 13, however, the horizontal signal line is divided into four parts, and the phases of the four parts are offset by 90° C. Therefore, an optical signal continuously appears at the output terminal. In addition, a sample-and-hold function is provided by the capacitor $C_S$.

The above photoelectric conversion apparatus can be applied to the image reader as shown in FIG. 6.

As has been described in detail above, according to the subtractor of the present invention, a circuit can be easily integrated since a circuit member such as a differential amplifier which is difficult to be integrated need not be used. Therefore, a compact apparatus can be manufactured at low cost.

What is claimed is:

1. A photoelectric conversion apparatus comprising:
a photoelectric conversion element;
first storage means for storing a first signal from said photoelectric conversion element;
second storage means for storing a second signal from said photoelectric conversion element;
buffer means for buffering output signals from said first and second storage means;
capacitor means coupled to said buffer means; and
resetting means connected to both input and output sides of said capacitor means.
said resetting means being connected to said output side of said capacitor means and grounding the output side of said capacitor means to hold the second signal output from said second storage means at the output side of said capacitor means when the second signal stored in said second storage means is read out, said resetting means being connected to said input side of said capacitor means and grounding the input side of said capacitor means to hold an inverted level of the second signal output from said second storage means at the output side of said capacitor means immediately before the first signal stored in said first storage means is read out.

2. An apparatus according to claim 1, wherein each of said first and second storage means includes a capacitor.

3. An apparatus according to claim 1, wherein said resetting means includes a MOS transistor.

4. A photoelectric conversion apparatus comprising:
capacitor means connected to an output terminal;
first and second storage means connected in parallel with each other to an input side of said capacitor means;
an image pickup element for supplying an output thereof to said first and second storage means; and
control means connected to both sides of said capacitor means, said control means being connected to said output side of said capacitor means and grounding the output side of said capacitor means to hold a second signal output from said second storage means at the output side of said capacitor means when the second signal stored in said second storage means is read out, said control means being connected to an input side of said capacitor means and grounding the input side of said capacitor means to hold an inverted level of the second signal output from said second storage means at the output side of said capacitor means immediately before a first signal stored in said first storage means is read out, wherein electrical charges stored in said first and second storage means are sequentially read out with a time difference.

5. An apparatus according to claim 4, wherein a noise component is sorted in said first storage means, and a signal component including the noise component is stored in said second storage means.

6. An apparatus according to claim 4, wherein each of said first and second storage means includes a capacitor.

* * * * *

UNITED STATES PATENT AND TRADEMARK OFFICE
CERTIFICATE OF CORRECTION

PATENT NO. :  5,162,912                                   Page 1 of 2
DATED      :  November 10, 1992
INVENTOR(S) : UENO ET AL.

It is certified that error appears in the above-identified patent and that said Letters Patent is hereby corrected as shown below:

On the title page:

At [56] References Cited

U.S. Patent Documents, insert:
```
4,910,597   3/1990   Harada et al.    358/213.15
4,914,319   4/1990   Hashimoto        307/353
4,914,519   4/1990   Hashimoto        358/213.18
```

At [56] References Cited

Foreign Patent Documents, insert:
```
62-279390   12/1987   Japan
63-72112    4/1988    Japan.
```

Column 8

Line 19, "A" should read --At--.

Column 9

Line 21, "node $P_1$and" should read --node $P_1$, and--

UNITED STATES PATENT AND TRADEMARK OFFICE
CERTIFICATE OF CORRECTION

PATENT NO. : 5,162,912

DATED : November 10, 1992

INVENTOR(S) : UENO ET AL.

It is certified that error appears in the above-identified patent and that said Letters Patent is hereby corrected as shown below:

Column 10

Line 6, "transistors M21 to M2n" should read --transistors $M_{21}$ to $M_{2n}$--.

Line 34, "capacitors CPI to CPn" should read --capacitors $C_{p1}$ to $C_{pn}$--.

Line 60, "transistors M61 to M6n," should read --transistors $M_{61}$ to $M_{6n}$,--.

Column 14

Line 1, "sorted" should read --stored--.

Signed and Sealed this

First Day of February, 1994

Attest:

BRUCE LEHMAN

Attesting Officer

Commissioner of Patents and Trademarks